(12) United States Patent
Zhang (10) Patent No.: US 8,452,043 B2
(45) Date of Patent: May 28, 2013

(54) SYSTEM FOR IDENTIFYING MOTION VIDEO CONTENT

(75) Inventor: Ji Zhang, Monte Sereno, CA (US)

(73) Assignee: Yuvad Technologies Co., Ltd. (CN)

( * ) Notice: Subject to any disclaimer, the term of this patent is extended or adjusted under 35 U.S.C. 154(b) by 625 days.

(21) Appl. No.: 12/085,927

(22) PCT Filed: May 22, 2008

(86) PCT No.: PCT/CN2008/071047
§ 371 (c)(1),
(2), (4) Date: May 30, 2008

(87) PCT Pub. No.: WO2009/024031
PCT Pub. Date: Feb. 26, 2009

(65) Prior Publication Data
US 2010/0166250 A1    Jul. 1, 2010

(51) Int. Cl.
*H04N 7/16* (2011.01)
*G06K 9/36* (2006.01)

(52) U.S. Cl.
USPC .............................. 382/100; 382/194; 725/19

(58) Field of Classification Search
USPC ..................................... 382/100, 194; 725/19
See application file for complete search history.

(56) References Cited

U.S. PATENT DOCUMENTS

| | | | |
|---|---|---|---|
| 3,919,479 A | 11/1975 | Moon et al. | |
| 4,441,205 A | 4/1984 | Berkin et al. | |
| 5,019,899 A * | 5/1991 | Boles et al. | 725/22 |
| 5,870,754 A | 2/1999 | Dimitrova et al. | |
| 5,926,223 A | 7/1999 | Hardiman | |
| 6,037,986 A * | 3/2000 | Zhang et al. | 375/240.12 |
| 6,084,539 A | 7/2000 | Yamada | |
| 6,374,260 B1 | 4/2002 | Hoffert et al. | |
| 6,473,529 B1 * | 10/2002 | Lin | 382/236 |

(Continued)

FOREIGN PATENT DOCUMENTS

| | | |
|---|---|---|
| CN | 1190218 A | 8/1998 |
| CN | 2387588 Y | 7/2000 |

(Continued)

OTHER PUBLICATIONS

Non-final Office Action dated Oct. 26, 2010, for U.S. Appl. No. 12/085,928.

(Continued)

*Primary Examiner* — Aaron W Carter
(74) *Attorney, Agent, or Firm* — Vista IP Law Group, LLP (57) ABSTRACT

A system for identifying motion video content, with a registered fingerprint database in advance for video contents of broadcasting video signals, wherein said system at least comprises a frame buffer into which a consecutive of video frame images of a motion video content to be identified are stored; a frame sampler by which sample values on the video frame images are obtained; a fingerprint store in which the sample values are held as a fingerprint A for search in the fingerprint database; and a matcher which performs a fingerprint pattern matching algorithm between the fingerprint A for search in the fingerprint database and fingerprints B contained in the fingerprint database so as to determine whether the motion video content has ever been broadcasted before. The system according to the present invention can effectively organize, archive, and search video content; lower the cost of digital storage devices; and identify video content efficiently and with minimal or no human interactions.

8 Claims, 7 Drawing Sheets

U.S. PATENT DOCUMENTS

| | | | |
|---|---|---|---|
| 6,834,308 B1 | 12/2004 | Ikezoye et al. | |
| 7,336,841 B2 * | 2/2008 | Neogi | 382/245 |
| 7,523,312 B2 | 4/2009 | Kalker et al. | |
| 7,690,011 B2 | 3/2010 | Lienhart et al. | |
| 7,738,704 B2 | 6/2010 | Lienhart et al. | |
| 7,809,154 B2 | 10/2010 | Lienhart et al. | |
| 8,073,194 B2 | 12/2011 | Lienhart et al. | |
| 8,365,216 B2 | 1/2013 | Lienhart et al. | |
| 8,374,387 B2 | 2/2013 | Lienhart et al. | |
| 2003/0126276 A1 | 7/2003 | Kime et al. | |
| 2004/0021669 A1 | 2/2004 | Fredlund et al. | |
| 2004/0240562 A1 | 12/2004 | Bargeron et al. | |
| 2005/0141707 A1 * | 6/2005 | Haitsma et al. | 380/201 |
| 2005/0149968 A1 | 7/2005 | Konig et al. | |
| 2005/0172312 A1 | 8/2005 | Lienhart et al. | |
| 2005/0177847 A1 | 8/2005 | Konig et al. | |
| 2005/0213826 A1 | 9/2005 | Neogi | |
| 2006/0129822 A1 | 6/2006 | Snijder et al. | |
| 2006/0184961 A1 | 8/2006 | Lee et al. | |
| 2006/0187358 A1 | 8/2006 | Lienhart et al. | |
| 2006/0195859 A1 | 8/2006 | Konig et al. | |
| 2006/0195860 A1 | 8/2006 | Eldering et al. | |
| 2006/0248569 A1 | 11/2006 | Lienhart et al. | |
| 2007/0055987 A1 | 3/2007 | Lu et al. | |
| 2007/0071330 A1 | 3/2007 | Oostveen et al. | |
| 2007/0124796 A1 | 5/2007 | Wittkotter | |
| 2007/0136782 A1 | 6/2007 | Ramaswamy et al. | |
| 2007/0162571 A1 | 7/2007 | Gupta et al. | |
| 2007/0186228 A1 | 8/2007 | Ramaswamy et al. | |
| 2007/0186229 A1 | 8/2007 | Conklin et al. | |
| 2008/0148309 A1 | 6/2008 | Wilcox et al. | |
| 2008/0310731 A1 | 12/2008 | Stojancic et al. | |
| 2009/0063277 A1 | 3/2009 | Bernosky et al. | |
| 2009/0074235 A1 | 3/2009 | Lahr et al. | |
| 2009/0092375 A1 | 4/2009 | Berry et al. | |
| 2009/0154806 A1 | 6/2009 | Chang et al. | |
| 2009/0213270 A1 | 8/2009 | Ismert et al. | |
| 2009/0324199 A1 | 12/2009 | Haitsma et al. | |
| 2010/0077424 A1 | 3/2010 | Ramaswamy et al. | |
| 2010/0122279 A1 | 5/2010 | Zhang | |
| 2010/0158358 A1 | 6/2010 | Lienhart et al. | |
| 2010/0158488 A1 | 6/2010 | Roberts et al. | |
| 2010/0169911 A1 | 7/2010 | Zhang | |
| 2010/0290667 A1 | 11/2010 | Lienhart et al. | |
| 2010/0306791 A1 | 12/2010 | Deng | |
| 2012/0063636 A1 | 3/2012 | Lienhart et al. | |

FOREIGN PATENT DOCUMENTS

| | | |
|---|---|---|
| CN | 1262003 A | 8/2000 |
| CN | 1341240 A | 3/2002 |
| CN | 1574953 A | 2/2005 |
| CN | 1628302 A | 6/2005 |
| CN | 1679051 A | 10/2005 |
| CN | 1679261 A | 10/2005 |
| CN | 1719909 A | 1/2006 |
| CN | 1723458 A | 1/2006 |
| CN | 1739121 A | 2/2006 |
| CN | 2914526 Y | 6/2007 |
| CN | 101002472 A | 7/2007 |
| CN | 101021852 A | 8/2007 |
| CN | 101047833 A | 10/2007 |
| CN | 101120594 A | 2/2008 |
| EP | 0838960 A2 | 4/1998 |
| EP | 1482734 A2 | 12/2004 |
| EP | 1760693 A1 | 3/2007 |
| GB | 2419489 A | 4/2006 |
| JP | 9274467 A | 10/1997 |
| KR | 20020001088 A | 1/2002 |
| WO | WO 0209447 A1 | 1/2002 |
| WO | WO 02065782 A1 | 8/2002 |
| WO | WO 2006/059053 A1 | 6/2006 |
| WO | WO 2007/080133 | 7/2007 |
| WO | WO 2007148264 A1 | 12/2007 |

OTHER PUBLICATIONS

Non-final Office Action dated Oct. 26, 2010, for U.S. Appl. No. 12/085,754.
Final Office Action dated Apr. 12, 2011, for U.S. Appl. No. 12/085,754.
Non-final Office Action dated Nov. 29, 2010, for U.S. Appl. No. 12/085,830.
Final Office Action dated Aug. 19, 2011, for U.S. Appl. No. 12/085,830.
Non-final Office Action dated Oct. 13, 2010, for U.S. Appl. No. 12/085,765.
Final Office Action dated Mar. 31, 2011, for U.S. Appl. No. 12/085,765.
Non-final Office Action dated Aug. 30, 2010, for U.S. Appl. No. 12/085,829.
Final Office Action dated May 19, 2012, for U.S. Appl. No. 12/085,829.
Non-final Office Action dated Oct. 29, 2010, for U.S. Appl. No. 12/085,835.
Final Office Action dated Apr. 13, 2011, for U.S. Appl. No. 12/085,835.
Non-final Office Action dated Dec. 1, 2010, for U.S. Appl. No. 12/085,827.
Final Office Action dated Apr. 19, 2012, for U.S. Appl. No. 12/085,827.
Non-final Office Action dated Oct. 13, 2010, for U.S. Appl. No. 12/085,764.
Final Office Action dated Mar. 24, 2011, for U.S. Appl. No. 12/085,764.
Cheung et al., "Efficient Video Similarity Measure With Video Signature", Jan. 2003.
Oostveen et al., "Feature Extraction and a Database Strategy for Video Fingerprinting", 2002.
Non-final Office Action dated Nov. 10, 2010, for U.S. Appl. No. 12/085,834.
Final Office Action dated Mar. 25, 2011, for U.S. Appl. No. 12/085,834.
Non-final Office Action dated Dec. 14, 2010, for U.S. Appl. No. 12/085,823.
Notice of Allowance and Fees Due dated Aug. 19, 2011, for U.S. Appl. No. 12/085,823.
Non-final Office Action dated Jul. 26, 2012, for U.S. Appl. No. 12/085,752.
International Preliminary Report on Patentability and Written Opinion dated Dec. 25, 2008, for PCT Application No. PCT/CN2008/071039.
International Search Report dated Dec. 25, 2008, for PCT/CN2008/071039.
International Preliminary Report on Patentability and Written Opinion dated Feb. 26, 2009, for PCT Application No. PCT/CN2008/071083.
International Search Report dated Feb. 26, 2009, for PCT Application No. PCT/CN2008/071083.
International Preliminary Report on Patentability and Written Opinion dated Mar. 12, 2009, for PCT Application No. PCT/CN2008/071082.
International Search Report dated Mar. 12, 2009, for PCT Application No. PCT/CN2008/071082.
International Preliminary Report on Patentability and Written Opinion dated Sep. 4, 2008, for PCT Application No. PCT/CN2008/071046.
International Search Report dated Sep. 4, 2008, for PCT Application No. PCT/CN2008/071046.
International Preliminary Report on Patentability and Written Opinion dated Sep. 4, 2008, for PCT Application No. PCT/CN2008/071047.
International Search Report dated Sep. 4, 2008, for PCT Application No. PCT/CN2008/071047.
International Preliminary Report on Patentability and Written Opinion dated Mar. 5, 2009, for PCT Application No. PCT/CN2008/071023.
International Search Report dated Mar. 5, 2009, for PCT Application No. PCT/CN2008/071023.
International Preliminary Report on Patentability and Written Opinion dated Mar. 5, 2009, for PCT Application No. PCT/CN2008/071028.

International Search Report dated Mar. 5, 2009, for PCT Application No. PCT/CN2008/071028.
International Preliminary Report on Patentability and Written Opinion dated Feb. 19, 2009, for PCT Application No. PCT/CN2008/071029.
International Search Report dated Feb. 19, 2009, for PCT Application No. PCT/CN2008/071029.
International Preliminary Report on Patentability and Written Opinion dated Feb. 12, 2009, for PCT Application No. PCT/CN2008/071030.
International Search Report dated Feb. 12, 2009, for PCT Application No. PCT/CN2008/071030.
International Preliminary Report on Patentability and Written Opinion dated Feb. 26, 2009, for PCT Application No. PCT/CN2008/071038.
International Search Report dated Feb. 26, 2009, for PCT Application No. PCT/CN2008/071038.
International Preliminary Report on Patentability and Written Opinion dated Feb. 26, 2009, for PCT Application No. PCT/CN2008/071033.
International Search Report dated Feb. 26, 2009, for PCT Application No. PCT/CN2008/071033.
International Preliminary Report on Patentability and Written Opinion dated Oct. 16, 2008, for PCT Application No. PCT/CN2008/071041.
International Search Report dated Oct. 16, 2008, for PCT Application No. PCT/CN2008/071041.
English Abstract of JP 9274467 A dated Oct. 21, 1997.
English Abstract of CN 101002472 A dated Jul. 18, 2007.
English Abstract of CN 1739121 A dated Feb. 22, 2006.
English Abstract of CN 101120594 A dated Feb. 6, 2008.
English Abstract of CN 1719909 A dated Jan. 11, 2006.
English Abstract of WO 0209447 A1 dated Jan. 31, 2002.
English Abstract of CN 101047833 A dated Oct. 3, 2007.
English Abstract CN 2914526 Y dated Jun. 20, 2007.
English Abstract CN 1262003 A dated Aug. 2, 2000.
English Abstract CN 2387588 Y dated Jul. 12, 2000.
English Abstract CN 1679261 A dated Oct. 5, 2005.
English Abstract CN 1574953 A dated Feb. 2, 2005.
English Abstract CN 1628302 A dated Jun. 15, 2005.
English Abstract CN 1190218 A dated Aug. 12, 1998.
English Abstract CN 1341240 A dated Mar. 20, 2002.
English Abstract CN 1723458 A dated Jan. 18, 2006.
English Abstract CN 101021852 A dated Aug. 22, 2007.
English Abstract CN 1679051 A dated Oct. 5, 2005.
English Abstract KR 20020001088 A dated Jan. 9, 2002.
Notice of Allowance and Fees Due dated Dec. 20, 2012, for U.S. Appl. No. 12/085,830.
Non-final Office Action dated Jan. 2, 2013, for U.S. Appl. No. 12/085,764.
Notice of Allowance and Fees Due dated Mar. 4, 2013 for U.S. Appl. No. 12/085,834.
Non-final Office Action dated Mar. 11, 2013 for U.S. Appl. No. 12/085,752.

* cited by examiner

Sub-sampling of a video frame

Figure 5

Frames are sub-sampled spatially and the samples are gathered into two-dimensional array Samples for consecutive frame images are made and organized into an two-dimensional array, each row corresponds to a sample set of a video image

Figure 6

The 5 different samples within the same video image

Samples for consecutive frame images

Figure 7

Subsample only the first N frames

Subsample N frames periodically

Subsample all frames

All of the frames of a video title

Figure 8

MySQL, Oracle

Plot of the time-series of the correlation between two fingerprint arrays A and &

Figure 13

SYSTEM FOR IDENTIFYING MOTION VIDEO CONTENT

RELATED APPLICATIONS

This application is the U.S. National Phase under 35 U.S.C. §371 of International Application No. PCT/CN2008/071047, filed on May 22, 2008, which in turn claims the benefit of U.S. Provisional Application No. 60/966,201, filed on Aug. 22, 2007, the disclosures of which Applications are incorporated by reference herein.

FIELD OF THE PRESENT INVENTION

The present invention relates to a system for identifying motion video content, more particularly, the present invention relates to a system for identifying fingerprints of motion video content.

The so called term "fingerprint" appearing in this specification means a series of dot information, in which each dot information is selected from a frame of pattern of television signals, and a plurality of frames can be selected from the television signals, and one or more dot data can be selected from one frame of pattern of television signals, so that the so called "fingerprint" can be used to uniquely identify the said television signals.

BACKGROUND OF THE PRESENT INVENTION

This document describes systems and systems for identifying video content. Video is the best way to distribute information to the masses. Today, almost all video content is created in digital forms, from the moment of video capture, to production, editing and special effects, and compression and distribution. In addition, increasing amount of video content is stored on DVDs, tapes, computer servers, and mass storage arrays.

Organizing digital video content is becoming a major challenge for all content owners, video and broadband internet service providers, and even home users. This is because unlike text, video content cannot be searched and identified easily by computers. Unlike audio, video content data has far large data size. In addition, it is very difficult and inefficient to identify video content by human interactions since the process is very time-consuming and cannot be scaled. These factors makes it difficult to effectively organize, archive, and search video content. However, the need for searching and identifying video content is increasingly important with the increasing bandwidth available on the network and the lowering cost of digital storage devices.

Therefore, there is a need to identify video content efficiently and with minimal or no human interactions.

SUMMARY OF THE INVENTION

It is object of the present invention to provide a system for identifying motion video content, which can effectively organize, archive, and search video content.

It is another object of the present invention to provide a system for identifying motion video content, which can lower the cost of digital storage devices.

It is another object of the present invention to provide a system for identifying motion video content, which can identify video content efficiently and with minimal or no human interactions.

It is another object of the present invention to provide a system for identifying motion video content, which can be used to extract information from a given video content segment and use the extracted information to further automatically identify the same video content if it is ever to appear again in a different video data stream.

Therefore, in the present invention, there is provided a system for identifying motion video content, with a registered fingerprint database in advance for video contents of broadcasting video signals, wherein said system at least comprises a frame buffer into which a consecutive of video frame images of a motion video content to be identified are stored; a frame sampler by which sample values on the video frame images are obtained; a fingerprint store in which the sample values are held as a fingerprint A for search in the fingerprint database; and a matcher which performs a fingerprint pattern matching algorithm between the fingerprint A for search in the fingerprint database and fingerprints B contained in the fingerprint database so as to determine whether the motion video content has ever been broadcasted before.

The system according to the present invention can effectively organize, archive, and search video content; lower the cost of digital storage devices; and identify video content efficiently and with minimal or no human interactions.

DETAILED DESCRIPTION OF THE INVENTION

In what follows, it provide descriptions for a method that can be used extract information from a given video content segment and use the extracted information to further automatically identify the same video content if it is ever to appear again in a different video data stream.

The capability to correctly identify video content has many important applications. These include but not limited to the following:

video search
video monitoring video splicing
video switching
video advertising

In what follows, it will first describe methods for extracting information from a given video content data, call the fingerprinting process. Then, it will describe how to use the fingerprint data to seek a match within a different video content.

In all of discussions, it focus on the handling of video signals, although in most cases, video signal comes together with audio signals as an integral part of the audio/video program. The audio signal will be considered in synchronization with the video signal. Fingerprint operations on the video signal identifies the video content as well as the associated audio content. Therefore, for the remainder of this document, it will limit discussions on dealing with fingerprint operations on video signal only.

It is also assumed that the video data has been digitized. It's possible to extend the idea to analog video content as well by first digitizing the analog video signal into digital data streams before applying the methods described herein. Therefore, it will not discuss how to deal with analog video content in this document.

In addition, it is assumed that the digital video content is in uncompressed formats. For compressed video content, decompression (or decoding) of the video data stream is required before applying the method used herein.

Lastly, it is assume that all video frames are in progressive format, which means that each video frame is displayed at the decoder together. For interlaced video frames, the frame is displayed in two separate time instances as two (top and bottom) fields. In this case, it is assumed that all of the processing described below apply to one of the fields.

Digital video data in uncompressed format can be represented by time sequence of video frames. Each frame can be described as a two dimensional array of pixel values. Each pixel value can be further decomposed into brightness (luminance) and color (chrominarice) components. For the purpose of obtaining and searching through video content, we only use the luminance pixel values of the video frames.

Digital video content consists of time-consecutive frames that, when presented to the human visual system, present the illusion of continuous motions. It first describe the methods for extracting information from these video frames so that the extracted information can be used to identify the frame.

The steps required to perform the fingerprint matching can be summarized as follows
  fingerprint data extraction for video A;
  organize the extracted fingerprint data from video A into a database;
  fingerprint data extraction from video B; and
  perform fingerprint pattern matching algorithm between the two fingerprints.

In what follows, we describe each of the steps in some details.

2.1 Fingerprint Extraction

The easiest way to do this would be to record all of the video frames and save them in a disk storage. The drawback of this problem, of course, is the tremendous amount of data storage capacity required. In addition, storage bandwidth limitations make it more difficult to rapidly retrieve the stored video frames.

The described method in this document starts with the first step of sub-sampling the video frames. Specifically, for each video frame, it perform a spatial sub-sampling, where a fixed number of samples are taken from the video frame and stored as sample values. The key steps can be illustrated in FIG. 1.

Figure 1:
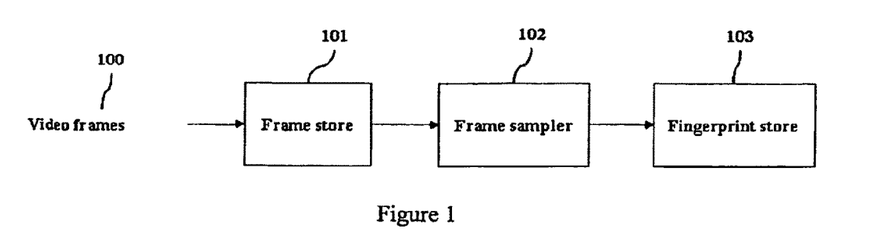
FIG. 1 is a schematic view of the key steps of sub-sampling the video frames.

The video frames 100 consists of time-continues video images. Each video frame is first held in the frame store 101, and then a frame sampler 102 is used to obtain the sampled value from frame store 101. The results are saved in fingerprint store 103. We describe each of the steps in some greater detail below.

2.1.1 Video Frame Sub-Sampling

Figure 5:
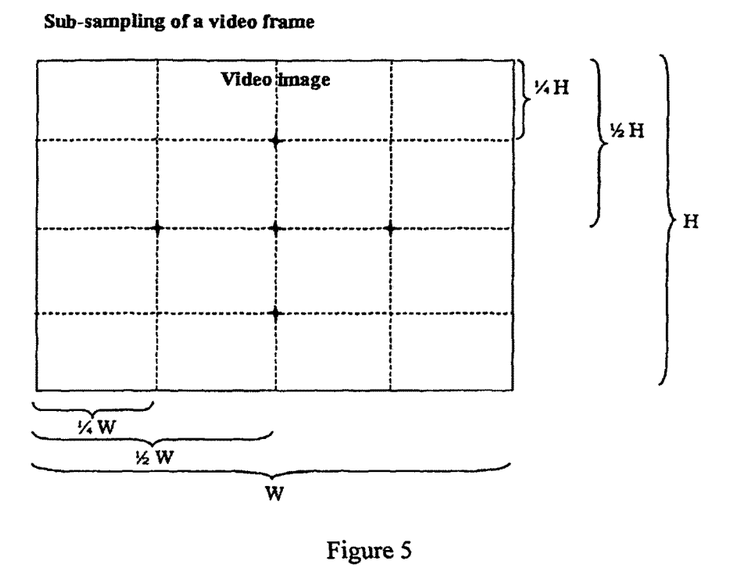
FIG. 5 shows a preferable scheme for sub-sampling of the frame.

On preferable sub-sampling scheme is to take 5 samples at different locations of the video frame. These samples should be taken as evenly distributed in the frame as possible, with the center of the frame as the center of the sub-sampling. One preferable sub-sampling of the frame is shown in FIG. 5. In this scheme, the 5 samples are spaced apart as an integer fraction of the frame resolution. If the video frame height is H and width is W, then the 5 samples are spaced at the intersections of ½ H, ¼ H, ¾ H and ½ W, ¼ W and ¾ W. as shown in FIG. 5.

Of course, there can be other methods of sub-sampling, but it will continue to use the above sub-sampling scheme to describe the rest of the methods. Those skilled in the art will be able to expand the method to other sub-sampling schemes, with more or less than 5 samples per video frame, or sub-sampling at varying number of pixels per video frame.

This sampling scheme is independent of the frame resolution or aspect ratio, making it more robust for dealing with video content of different resolutions and aspect ratios.

2.1.2 Sub-Sampling of Multiple Video Frames

Figure 6:
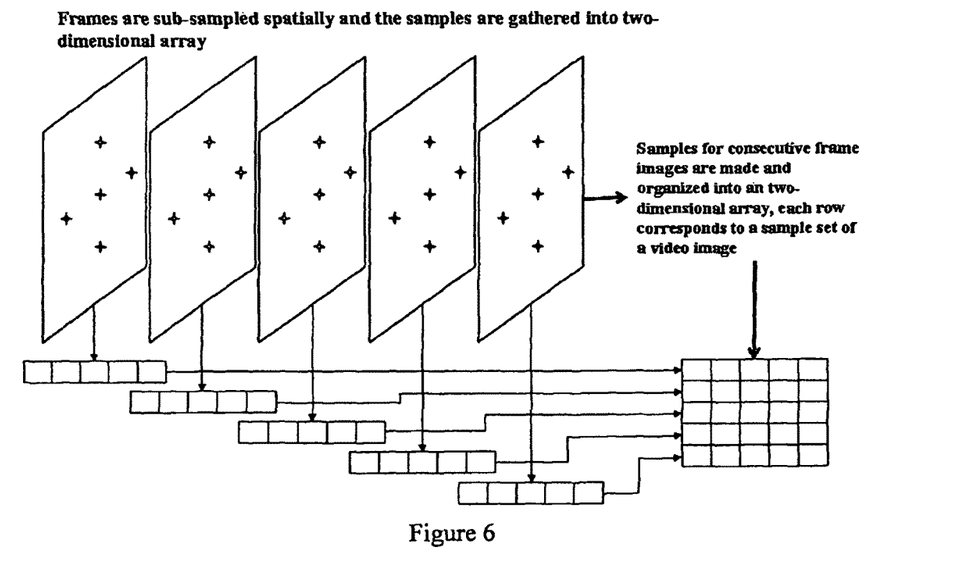
FIG. 6 shows the sub-sampling process for each video frame.
Figure 7:
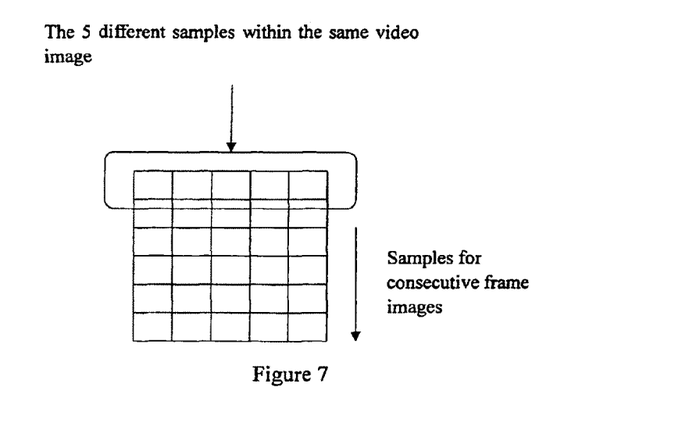
FIG. 7 shows how the sampled values are organized.

The sub-sampled values are saved for each of the frames. From the above description, it is noted that 5 frame samples are obtained for each video frame. It repeat this process for several consecutive N number of video frames. For example, it can sub-sample N=50 consecutive video frames. And then organize the sub-sampled values into a 5×50 array. This sub-sampling process is shown in FIG. 6 and how the sampled values are organized is shown in FIG. 7.

This array is what we called the fingerprint of the video content. From the above description, it is noted that the fingerprint covers only 50 video frames, for PAL video format, it's 2 seconds worth of video, for NTSC, it's less then 2 seconds. If it can uniquely identify this N video frames through the sub-sampled values, then it can significantly reduce the computation and storage required for the identification.

The fingerprint only identifies the 50 video frames within the video content, but not the remainder of the video content. For most video content, where the content titles are usually static, uniquely identifying a segment of the content is sufficient to uniquely identifying the entire video content title.

Figure 8:
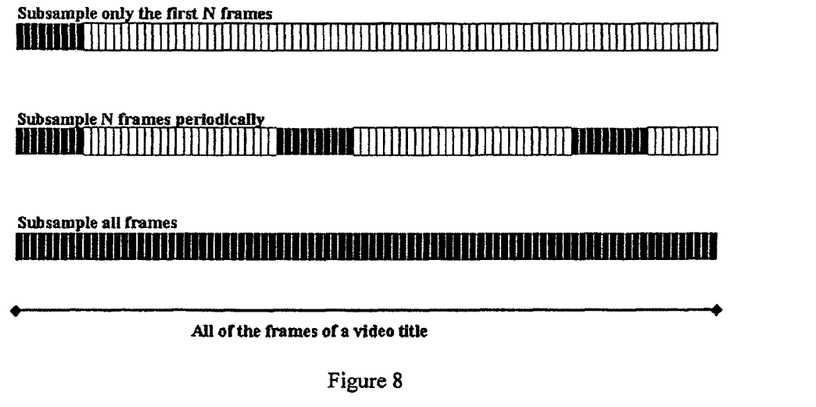
FIG. 8 illustrates several preferable ways to determine the number of video frames to sub-sample.
Figure 9:
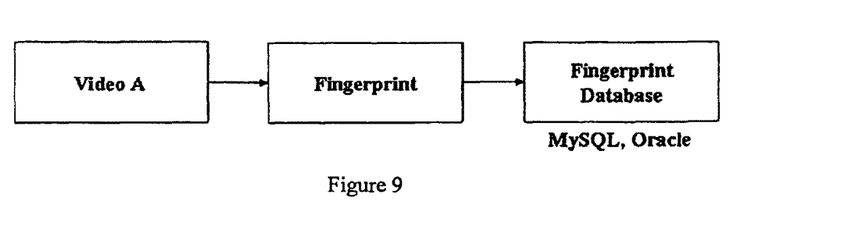
FIG. 9 shows a general process of fingerprint extraction.

For those content where segments of which may be re-arranged, it may need to sub-sampling more frames. Therefore, there are provided several preferable ways to determine the number of video frames to sub-sample, that is
  sub-sample N consecutive video frames on somewhere in the video content, for example at the beginning of the video content;
  sub-sample N consecutive video frames at fixed time intervals; and
  sub-sample all of the video frames for the entire video content title.

This can be illustrated in FIG. 8. Obviously, the first method requires the least amount of computations, memory and storage. The last method requires the most.

Each consecutively sampled video frames results in a continuous two-dimensional array of sampled values. This sampled array is the so-called fingerprint for the sampled video content.

From the above, it is noted that depending on the sampling method used, there maybe more than one fingerprint arrays for a given video content. For the first and the third sampling methods, there is only one fingerprint, for the second sampling method, there can be multiple fingerprint arrays, each identifying a corresponding segment of the video content. Of course, multiple consecutive fingerprint arrays can be organized into a more complex fingerprint arrays, which will not be discussed in this document.

In what follows, it focus our discussions on the handling of a single fingerprint array.

2.2 Fingerprint Matching

In this section, it describe methods for the inverse of the fingerprinting process, i.e., to use the given fingerprint array to seek a match within a different video content stream which may match partially or entirely the video content represented by the fingerprint.

There are several different scenarios between the two video contents. Let's call the video content, from which the fingerprint is extracted, as video A, and call the video content, which it will seek to find a match with the video A fingerprint, as video B. If such a match is determined to be true, then it conclude that original video contents A and B are identical at least for the sections associated with the matching fingerprint. This process can be illustrated in FIG. 2.

Then video A and B may contain identical video content albeit they may be of different resolution, aspect ratio and possibly with different levels of quality degradations. For the purpose of discussions, this document will not address these different scenarios. In stead, it will focus on how to seek a match between the fingerprints from the two video sequences.

Figure 2:
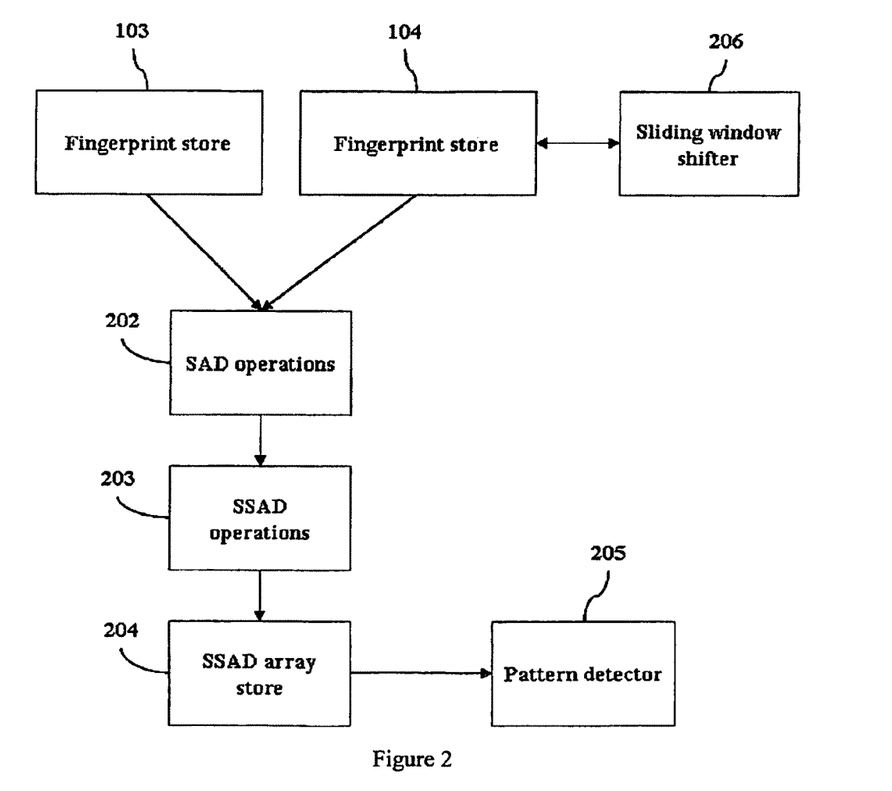
FIG. 2 is a schematic view showing the matching process to determine whether original video contents A and B are identical at least for the sections associated with the matching fingerprint.

Specific steps can be illustrated in FIG. 2, specifically, two fingerprint stores hold the data that will go through several steps of processing to determine if they are a match or not.

2.2.1 The Sum of Absolute Difference Operations

Figure 10:
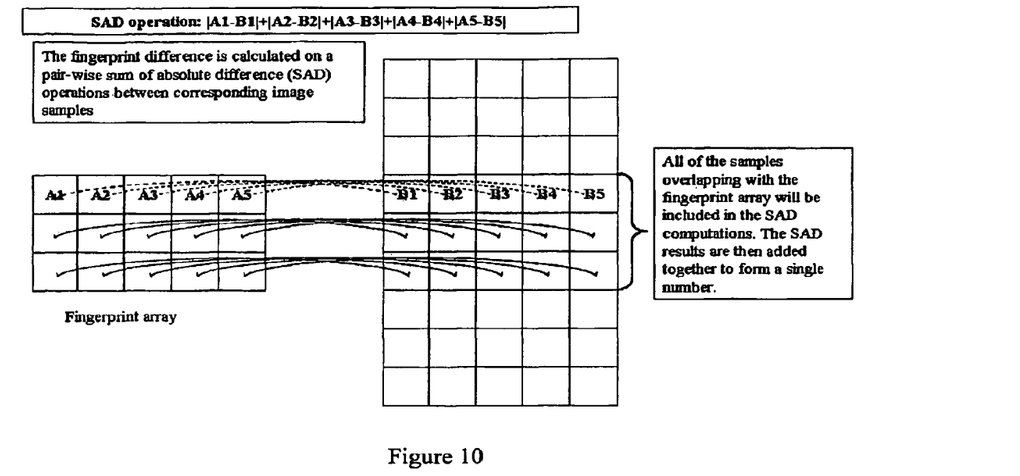
FIG. 10 shows the fingerprint matching algorithm on SAD operations which are performed between the samples obtained from two video frames.
Figure 11:
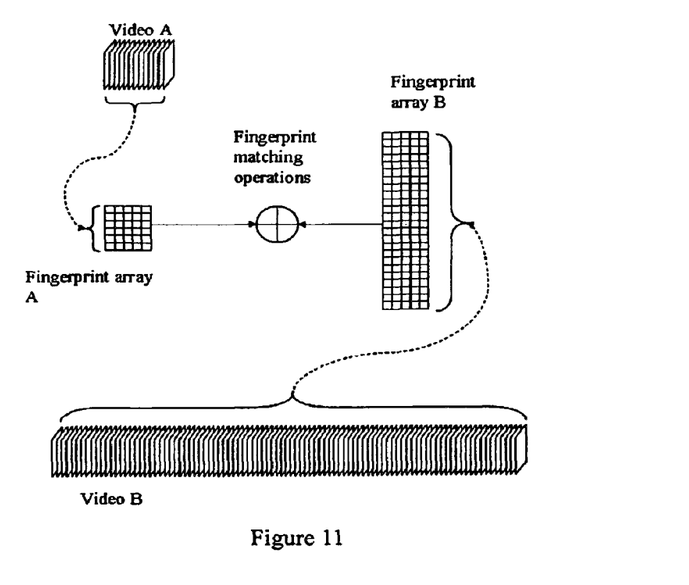
FIG. 11 shows the matching operations performed between the samples obtained from two video frames.

The key processing required for the fingerprint matching algorithm is the Sum of Absolute Difference (SAD) operations between the two fingerprints. The operation is performed between the samples obtained from two video frames. Specifically, consider the example given in FIG. 10 where 5 samples are obtained from the video frame A. Let's denote these samples as A1, A2, A3, A4, A5. We also obtain 5 samples from the video frame B, and denote the samples as B1, B2, B3, B4, B5. Then, the SAD operation between these two frames are given by:

$$SAD(A,B)=|A1-B1|+|A2-B2|+|A3-B3|+|A4-B4|+|A5-B5| \quad (EQ\ 1)$$

where the |A−B| is the absolute value operation.

The SAD operation basically evaluates the differences between the sample sets of the two video frames A and B. Larger value of SAD(A,B) implies bigger image content differences between the two video frames. This process can be illustrated in FIG. 10.

2.2.2 The Moving SAD Window and Sum of SAD (SSAD) Array

The SAD operation described above is repeated for two fingerprint arrays, one obtained from fingerprint A and the other obtained from the fingerprint B. The goal is to search through fingerprint B to see if there is a subsection of which that matches fingerprint A. The fingerprint A is assumed to have less number of samples than fingerprint B. The moving window of SAD operation defined as follows:

First, fingerprint A and B are item-wise associated with each other, because fingerprint A is smaller than fingerprint B in number of samples, only some of the samples from fingerprint B are associated with those within fingerprint A.

Next, all of the fingerprint B samples within this window are included in the SAD operations with fingerprint A samples, and the results are added together to form a single sum of SAD (SSAD) number.

Figure 12:
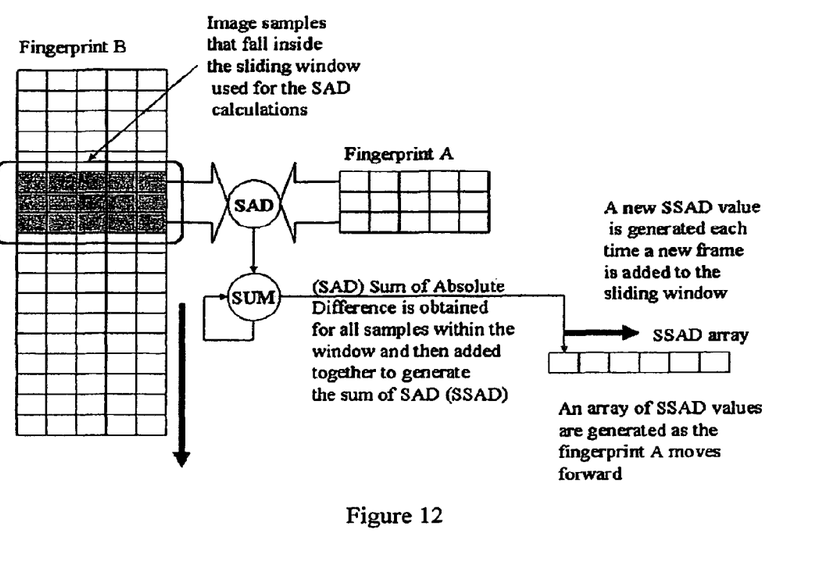
FIG. 12 illustrates how a series of SSAD values are generated.

The same process is then repeated by shifting the position of fingerprint B relative to A by one frame. Each such shift results in a new SSAD value generated. Therefore, a series of SSAD values are generated and saved in a SSAD array.

This process can be illustrated in FIG. 12.

2.2.3 The Fingerprint Match Detection

The fingerprint match detection is a process applied to the SSAD time-series of numbers. From the previous descriptions, it is noted that SSAD time-series represents a time-shifted measure of the difference between two video frame sequences under comparison. When the SSAD value is low, it means that the two sections of fingerprinted video frames are similar, otherwise they are not. However, due to the fact that different resolution, different video quality degradation (due to compression), and different noise level all contribute to the increase in SSAD values, so the absolute values of the SSAD series themselves are not sufficient to determine the location of a possible fingerprint match.

Figure 13:
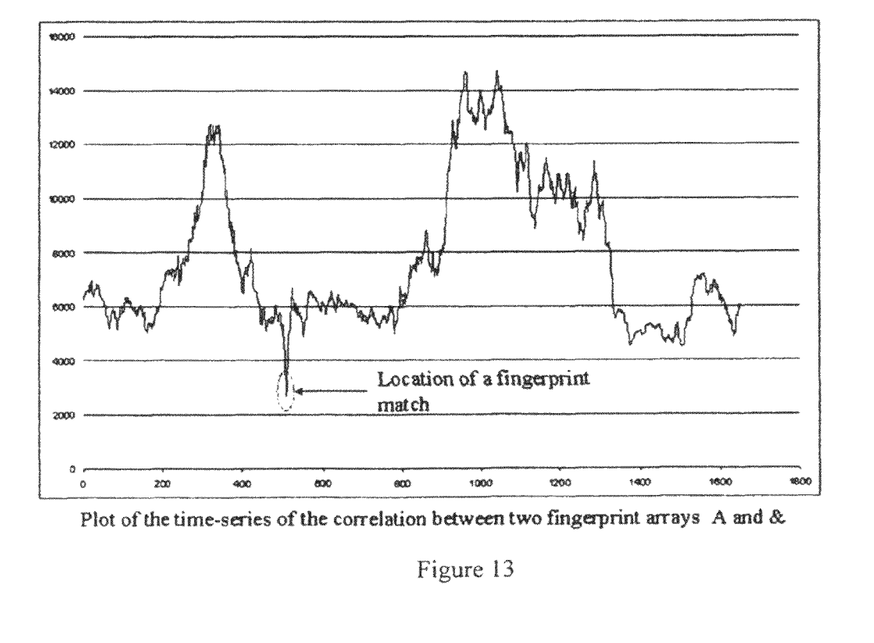
FIG. 13 show that the fingerprint match is identified by a very sharp drop in the SSAD values just before the match and a very sharp increase in SSAD values just after the match.

The fingerprint match is identified by a very sharp drop in the SSAD values just before the match and a very sharp increase in SSAD values just after the match. This can be shown in an actually measured SSAD values in FIG. 13.

Figure 3:
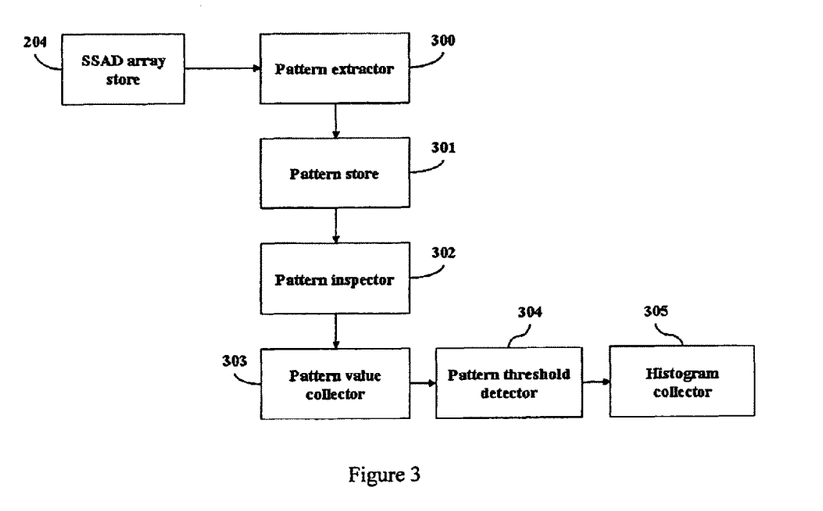
FIG. 3 illustrates the key element to detect the sharp drop pattern within the SSAD values.
Figure 4:
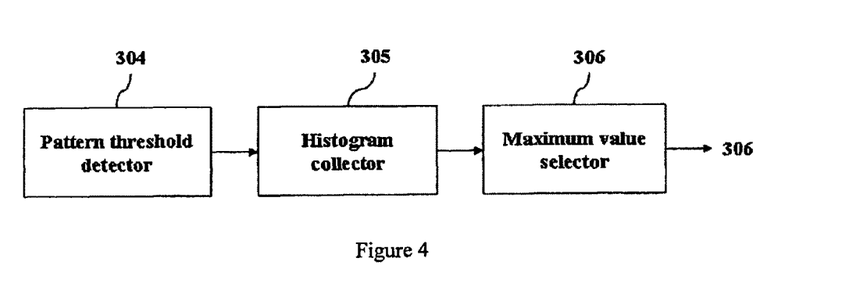
FIG. 4 illustrates the further key element to detect the sharp drop pattern within the SSAD values.

The key element to detect the sharp drop pattern within the SSAD values can be illustrated in FIG. 3. In this diagram, the SSAD values are stored in 204. The pattern extractor inspects all neighboring SSAD values and obtain the so-called the pattern values. Specifically, if SSAD values are S(1), S(2), ..., S(n), S(n+1), and denote the derived pattern values as P(1), P(2), P(3), and so forth.

Clearly, S(n) represents the difference between video A and video B on their respective n-th frame within the fingerprint window. Note that for video fingerprint B, the index n refers to a different video frame each time the fingerprint array B is shifted by one frame relative to fingerprint array A.

The pattern values can be obtained by the pattern extractor 300, which is described as follows:

$$P(n)=(S(n)-S(n-1))/S(n) \quad (EQ\ 2)$$

Note that P(1) is not defined and will not be used. In addition, it do the above only if S(n) is not zero and above certain fixed threshold. Otherwise, P(n) is set to zero.

From this, it can tell that if P(n) is a positive number of S(n)>S(n−1), i.e., the SSAD value is increasing, it means that the two represented video frames are diverging from each other, indicating less probability that a match will be found. On the other hands, if P(n) is a negative number, it means that the two video frames are increasingly more similar to each other. The value of P(n) represents the percentage of the change of S(n), and larger P(n) means more rapid change in values of S(n) vs. S(n−1).

The extracted pattern values form another series of numbers which are then stored in pattern store 301.

The pattern inspector 302 inspects the values contained in pattern store 301 by the following steps:

Select a specific position, say m, within the pattern store 301 and identify all of the values within a window of size 2M−1 of position m:

$$P(m-M+1), P(m-M+2),\ \ldots,\ P(m-1), P(m),$$
$$P(m+1), \ldots, P(m+M-2), P(m+M-1) \quad (EQ\ 3)$$

These values are then added together by the pattern value collector 303 and yields a result C(m), in the following way:

$$C(m)=-P(m-M+1)-\ \ldots\ -P(m-1)-P(m)+$$
$$P(m+1)+\ldots+P(m+M-1) \quad (EQ\ 4)$$

From the above, it is noted that C(m) will be a large number when there is a sharp dip in the values of pattern values P( . . . ) at position m. Otherwise, C(m) tends to be small values.

Finally, the value C(m) is compared with a user given threshold 304 to determine if a match has been found between the two fingerprints, and the frame number is determined through the above process and signaled as output to histogram collector, shown in FIG. 3.

The histogram collector 305 gathers all of the pattern values C(m) that have exceeded the given threshold, count the number of times each value exceeded the threshold, and store them into an array. Each item in the array holds the value m, C(m) and the number of times that C(m) has crossed the threshold. Finally, the maximum value selector 306 inspect all such values within the histogram for the value that has appeared the most number of times. This value refers to the frame that is identified as the fingerprint matched frame.

The invention claimed is:

1. A motion video content identification system, comprising:
   a frame buffer into which a plurality of video frame images of a motion video content to be identified are stored consecutively;
   a frame sampler configured to obtain and format a plurality of sample values at predetermined locations on the plurality of video frame images;
   a fingerprint store configured to store the plurality of sample values as a query fingerprint item;
   a fingerprint database including at least one fingerprint pattern; and
   a matcher configured to perform a fingerprint pattern matching algorithm between a plurality of fingerprint query items in the fingerprint stores with at least one fingerprint pattern in the fingerprint database so as to determine whether the motion video content associated with the plurality of query items is identical to the video content associated with the fingerprint in the fingerprint database, comprising:
      a pattern array store for storing a series of sum of absolute differences (SSAD), denoted as S(1), S(2), . . . , S(n), S(n+1), with S(n) representing a difference between a query term and a fingerprint pattern on respective n-th frame;
      a pattern extractor configured to inspect neighboring SSAD values to generate a plurality of pattern values, denoted as P(1), P(2), P(3), and so forth,
         P(n)=(S(n)−S(n−1))/S(n) with n>1 and S(n) not equal to zero,
         P(n)=0 otherwise;
      a pattern store for storing a series of numbers generated from the pattern values; and
      a pattern inspector configured to select values contained in pattern store by the following steps:
         selecting a specific position, denoted as m, within the pattern store and identifying all values within a predetermined window of size 2M−1 of position m: P(m−M+1), P(m−M+2), . . . , P(m−1), P(m), P(m+1), . . . , P(m+M−2), P(m+M−1), with M being a constant;
         generating a combined pattern value
            C(m)=−P(m−M+1)− . . . −P(m−1)−P(m)+P(m+1)+ . . . +P(m+M−1);
         comparing the combined pattern value C(m) with a user given threshold to determine if a match has been found between the query terms and the fingerprint pattern; and
         identifying the frame number m in response to finding a match.

2. The system of claim 1, wherein said matcher is configured to perform the fingerprint matching by:
   sampling corresponding image positions between the plurality of query items and the at least one fingerprint pattern to generate a plurality of sums of absolute differences (SAD); and
   adding all SAD corresponding to aligned frames between the plurality of query terms and the plurality of fingerprint patterns to generate SSAD values.

3. The system of claim 1, further comprising a histogram collector configured to gather all of the combined pattern values C(m) that have exceeded the threshold, count the number of times each value exceeds the threshold, and store them into an array, each item in the array holds the value m, C(m) and the number of times that C(m) has crossed the threshold.

4. The system of claim 3, further comprising a maximum value selector configured to inspect the array within the histogram collector for the combined pattern value C(m) that has appeared the most number of times, and identify the corresponding frame as a fingerprint matched frame.

5. The system of claim 1, wherein the plurality of sample values are selected for luminance or brightness of the sampled video image.

6. The system of claim 1, wherein the plurality of sample values are generated on the same positions within each video frame, and the same number of video samples are made in each frame and their positions within each frame are fixed from frame to frame.

7. The system of claim 1, wherein the plurality of locations in on the video image frame of height H and width W measured in number of pixels includes:
   a first location at an intersection of a first line at a distance of about ½ H from a top edge of the frame and a second line substantially perpendicular to the first line and at a distance of about ½ W from a left edge of the frame;
   a second location at an intersection of the first line and a third line substantially perpendicular to the first line and at a distance of about ¼ W from the left edge;
   a third location at an intersection of the first line and fourth line substantially perpendicular to the first line and at a distance of about ¾ W from the left edge;
   a fourth location at an intersection of a fifth line substantially parallel to the first line and at a distance of about ¼ H from the top edge and the second line; and
   a fifth location at an intersection of a sixth line substantially parallel to the first line and at a distance of about ¾ H from the top edge and the second line.

8. The system of claim 7, wherein the plurality of locations further includes:
   a sixth location at an intersection of the third line and the fifth line;
   a seventh location at an intersection of the third line and the sixth line;
   an eighth location at an intersection of the fourth line and the fifth line; and
   a ninth location at an intersection of the fourth line and the sixth line.

* * * * *